Kubota

[11] 4,312,543
[45] Jan. 26, 1982

[54] CONTROL DEVICE FOR A VEHICLE HYDRAULIC BRAKING SYSTEM

[75] Inventor: Hitoshi Kubota, Fujisawa, Japan

[73] Assignee: Nissan Motor Company, Limited, Yokohama, Japan

[21] Appl. No.: 109,485

[22] Filed: Jan. 4, 1980

[30] Foreign Application Priority Data

Jan. 23, 1979 [JP] Japan .................................. 54-5511

[51] Int. Cl.$^3$ .............................................. B60T 8/12
[52] U.S. Cl. ................................... 303/24 R; 303/119
[58] Field of Search ....................... 188/181 A, 181 R; 303/6 C, 24 R, 24 B, 24 F, 109, 111, 119

[56] References Cited

U.S. PATENT DOCUMENTS

3,938,538  2/1976  Putman et al. ................. 303/24 B X

Primary Examiner—Duane A. Reger
Attorney, Agent, or Firm—Schwartz, Jeffery, Schwaab, Mack, Blumenthal & Koch

[57] ABSTRACT

A control device for a vehicle hydraulic braking system which comprises a split system master cylinder, a hydraulic circuit and a plurality of wheel cylinders for respective front and rear wheel, controls fluid pressure applied to the wheel cylinders in response to load subject to corresponding wheels. The control device comprises a load measuring means generating a control signal corresponding to the load subject to the corresponding wheel, a control circuit electrically connected to the load measuring means, and a control valve having means for adjust a force urging a valve member onto a valve seat. The control valves includes a thrusting member movable from a first position in which the valve is opened to connect the inlet port of the valve communicating with the master cylinder through the hydraulic circuit and the outlet port communicates with the wheel cylinder to a second position in which the valve is closed and from the second position to the first position. The means adjusting a force urging the valve on to the valve seat is electrically associated with the control circuit to be controlled and actuated when the load measuring means detects load heavier than that subject the others to increase fluid pressure applied to corresponding wheel cylinder.

25 Claims, 7 Drawing Figures

CONTROL DEVICE FOR A VEHICLE HYDRAULIC BRAKING SYSTEM

BACKGROUND OF THE INVENTION

1. Field of the Invention

The present invention generally relates to a hydraulic braking system for an automotive vehicle. More specifically, the present invention relates to a control device for controlling hydraulic brake fluid applied to respective wheel cylinders provided for each wheel of an automotive vehicle.

2. Description of the Prior Art

In a hydraulic braking system for an automotive vehicle, brake fluid is supplied to the brake cylinder provided for each wheel of the vehicle. When the foot pedal is moved from the released position to the braking position and thus fluid is supplied to the brake cylinders to apply the brake, it is possible for the rear wheels to lock the front wheels. This is very dangerous and can result in the vehicle skidding.

Practically, when the vehicle is driven and the braking system is temporarily applied, the inertia of the vehicle increases the load applied to the front axle and thus to causes the load to be distributed unevenly between front and rear wheel axles. Meanwhile, upon braking the vehicle, it will be apparent the wheels subject to a relatively light load will lock before the others. Thereby, if the same fluid pressure is applied to both front and rear wheels, it may cause the rear wheels to lock in advance of the front wheels and result in the vehicle skidding.

To prevent the vehicle from skidding, a control valve means has been provided in the hydraulic circuit connecting a master cylinder to the wheel cylinder for each rear wheel. This conventional control valve means controls the supply of brake fluid to the rear wheel cylinders to limit the value of the pressure applied to the rear wheel cylinder. Although this control valve means can prevent the vehicle from skidding because of a difference of brake application timing between the front and rear wheels, it cannot correct for an uneven load on the right and left sides. A difference in the load on the right and left side wheels may be caused, for example, by braking when the vehicle is going round a curve; then, clearly, the load applied to the other wheels is larger than that applied to the inner wheels. Then, if the braking system is operated to decelerate the vehicle, the different load on inner and outer wheels causes a lopsided braking action.

Further, as the conventional control valve means is merely provided in the hydraulic circuit connecting the master cylinder with the rear wheel cylinders, it is impossible to adjust the ratio of pressure fluid supplied to the front wheel cylinders. If the load applied to the rear wheel or wheel axles is smaller than that applied to the front wheel cylinder, it will not be possible to control the ratio of fluid pressure.

Yet further, the conventional control valve means controls both rear wheels together and cannot compensate for loads applied to each rear wheel separately. Therefore, the above-mentioned control valve means cannot completely prevent the vehicle from skidding.

To prevent the vehicle from skidding completely, it will be necessary to alter the hydraulic pressure applied to each wheel corresponding to the relative of the load applied thereto.

SUMMARY OF THE INVENTION

Therefore, it is an object of the present invention to provide a hydraulic braking system for an automotive vehicle capable of varying the hydraulic pressure applied to each wheel cylinder corresponding to the relative load applied to each wheel.

It is a more specific object of the present invention to provide a control means to control the supply of brake fluid to each wheel cylinder corresponding to the relative load applied to each wheel.

Another object of the present invention is to provide a measuring means to measure the relative load applied to each wheel.

Still another object of the present invention is to provide a control valve means which is provided in a hydraulic circuit connecting a master cylinder to each of the front and rear wheels and is operated to control the supply of fluid according to the relative loads measured by the load measurement means.

A further object of the present invention is to provide a control valve means having an adjustable biasing means to bias a valve member, which the biasing means can be adjusted the force acting against fluid pressure to adjust ratio of building up braking pressure of fluid.

The other objects and advantages sought in the invention will be made clear and be understood by hereinafter described preferred embodiment of the present invention.

BRIEF DESCRIPTION OF THE DRAWINGS

The present invention will become more fully understood from the detailed description given below, and the accompanying drawing of the preferred embodiment of the present invention, which, however, are not to be taken as limitative of the present invention in any way, but are for the purpose of elucidation and explanation only.

DESCRIPTION OF THE PREFERRED EMBODIMENT

Figure 1:
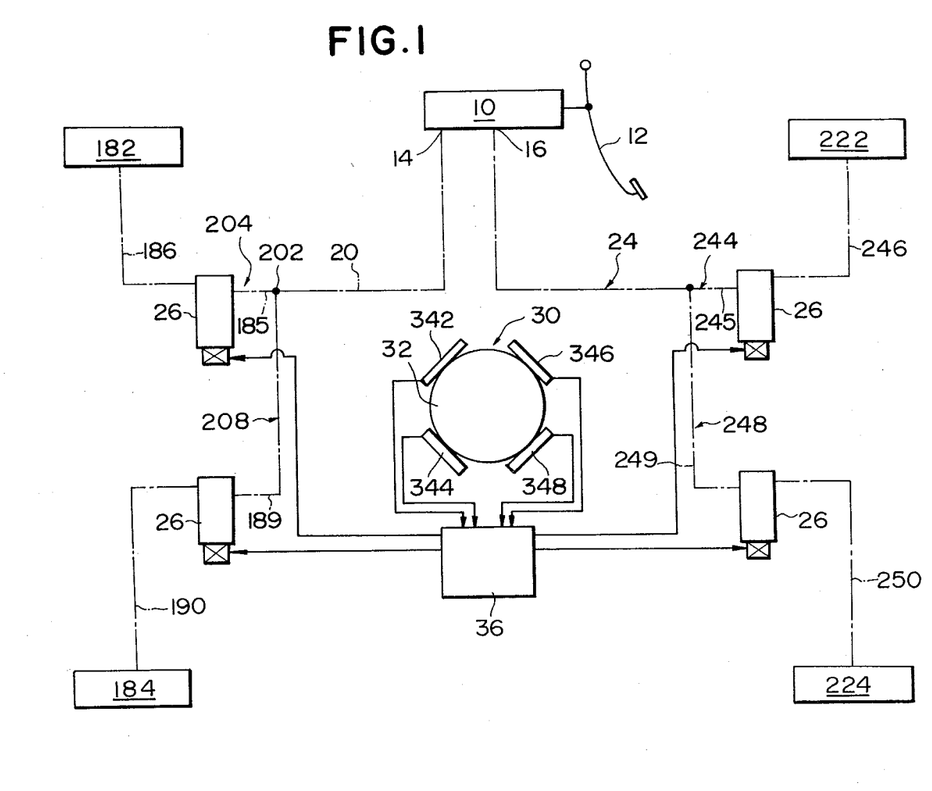
FIG. 1 is a schematic illustration of the preferred embodiment of a hydraulic braking system applied to an automotive vehicle in accordance with the present invention.

Referring now to the drawings, particularly to FIG. 1, there is schematically illustrated a hydraulic braking system including a split system master cylinder 10 drivingly connected to a foot pedal 12 through a hydraulic brake boost mechanism (not shown). Though not illustrated, the boost mechanism is located adjacent the master cylinder 10 and connects the latter with the foot pedal 12 through a pressure transmission rod provided therein. The boost mechanism increases the pressure in a manner which is well-known to those skilled in the art, when the foot pedal 12 is moved from the released position to the applied position, and operates master cylinder 10 through the transmission rod for applying the brakes.

The master cylinder 10 is provided with two outlet ports 14 and 16. The outlet port 14 is connected with front wheel front cylinders 182 and 184 through a hydraulic circuit 20. The circuit 20 is branched at a junction 202 into branch circuits 204 and 208. The branch circuits 204 and 208 are connected to the front wheel cylinders 182 and 184 respectively. The outlet port 16 is connected with rear wheel cylinders 222 and 224 through a hydraulic circuit 24. The circuit 24 is branched at a junction 242 into branch circuits 244 and 248. The branch circuits 244 and 248 are connected to the rear wheel cylinders 222 and 224 respectively. When the foot pedal 12 is moved to the applied position, hydraulic fluid is supplied to the front and rear wheel cylinders 182, 184, 222 and 224 through branch circuits 204, 208, 244 and 248 respectively.

Between the master cylinder 10 and each front and rear wheel cylinder, there is provided a hydraulic pressure control valve 26. Each control valve 26 separates each branch circuit 184, 188, 242 and 248 into two portions one of which is upstream of the control valve 26 and is represented by a reference numeral 185, 189, 245 or 249 respectively and the other is downstream of the control valve 26 and is represented by a reference numeral 186, 190, 246 or 250 respectively.

As shown in FIG. 1, a means 30 for measuring loads applied to each vehicle wheel is provided on the vehicle. The measurement means 30 comprises a ball member 32 movably mounted on a substantially horizontal surface and a plurality of load cells 342, 344, 346 and 348. Each load cell 342, 344, 346 and 348 faces the ball in a direction corresponding to one of the wheels with respect to the neutral position of the ball member 32 on the surface. Each load cell 342, 344, 346 and 348 is vertically secured on the surface so as to surround the ball member 32 in light contact. Each load cells 342, 344, 346 and 348 is electrically connected to an electrical control circuit 36, which will be described and illustrated hereafter in detail. The control circuit 36 is connected to each of the pressure control valve means 26 in order to control the supply of fluid to each wheel cylinder 182, 184, 222 and 224 corresponding to the relative load applied to each wheel.

Figure 2:
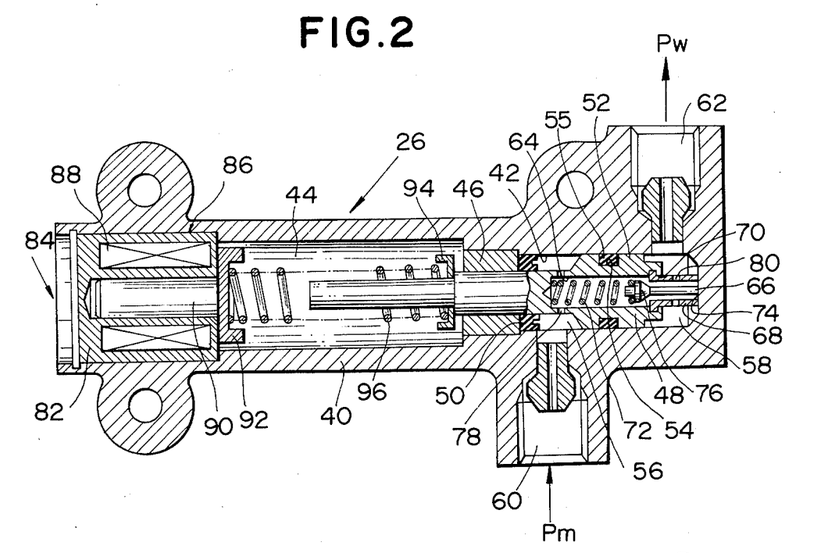
FIG. 2 is an enlarged sectional view of a control valve means employed in the braking system of FIG. 1, sectioned along the longitudinal axis.

Referring to FIG. 2, there is illustrated the detailed construction of the hydraulic pressure control valve means 26 which is well-known as a proportioning valve. The control valve 26 has a housing 40 formed with a longitudinal bore having two portions 42 and 44. The portion 42 of the bore has a diameter smaller than that of the other portion 44. At the end of the portion 42 adjacent the portion 44, an annular retainer 46 is provided on the internal surrounding of the portion 42. A thrust piston 48 is disposed within a portion 42 and is slidably received by the retainer 46. Adjacent the retainer 46, there is provided an annular sealing member 50 which acts with the thrust piston 48 to divide the portions 42 and 44 in a fluid proof manner. The thrust piston 48 has an annular projecting land 52, whose outer periphery slidably contacts the internal periphery of the portion 42. On the outer periphery of the land 52, there is formed a recess 54 in which is received an annular sealing member 55 for a fluid proofing purposes. By the projecting land 52 of the thrust piston 48, the portion 42 of the bore is further separated into respectively independent two chambers 56 and 58. The chamber 56 communicates with an inlet port 60 and thus is connected to the master cylinder 10 through the hydraulic circuit and the inlet port 60. The chamber 58 communicates with an outlet port 62 and thus is connected to the wheel cylinder through the hydraulic circuit and the outlet port 62.

The thrust plunger 52 is provided with a bore 64 which is open the end 70 of the plunger which faces the chamber 58. At the open end 70 of the plunger 52, there is provided a valve member 66 which is well-known as a poppet valve, with a valve seat 68. The valve seat 68 is secured on the open end 70 of the plunger 52, by clamping. The valve member 66 is longer than the valve seat 68 so that when it seats on the valve seat 68, the end 69 of the valve member projects from the seat 68. A helical spring 72 is disposed in the bore 64, one end of which abuts the bottom 74 of the bore and the other end abuts the head 76 of the valve member 66. Thereby, the valve member 66 is urged toward the valve seat 68 in the normal position. In this normal position, one end of the valve seat 68 abuts the bottom of the bore 64 and the end 69 of the valve member also abuts the bottom so as to release the valve head 76 from the seat 68 and thus to open the valve.

The thrust plunger 52 is provided with a plurality of orifices 78 communicating the chamber 56 to the bore 64 of the plunger 52. The valve seat 68 is provided with a plurality of orifices 80 communicating the bore 64 of the plunger to the chamber 58 through the valve seat 68. Thereby, when the valve member 66 is released from the valve seat 68 and thus opens the valve, the chamber 56 communicates to the chamber 58 through the bore 64 of the thrust plunger 52.

The portion 44 is open at the end opposite to the portion 42. An end fitting 82 is fixedly secured on the open end 84. The end fitting 82 has a solenoid 86 comprising a solenoid coil 88 and a plunger 90. At one end of the plunger 90 a spring seat 92 is secured and faces toward the bore. Opposing to the spring seat 92, the thrust plunger 52 is also provided with a spring seat 94. A helical spring 96 is disposed between the spring seats 92 and 94 so as to constantly bias the thrust plunger toward the chamber 58. The force of spring 96 biasing the thrust plunger 52 can be adjusted by the motion of the plunger 90 of the solenoid 86. The solenoid 86 is electrically connected to the control circuit 36 which will be described hereafter in detail and thereby, according to the voltage supplied to the solenoid coil, the plunger 90 is moved to adjust the force of the helical spring 96.

Figure 3:
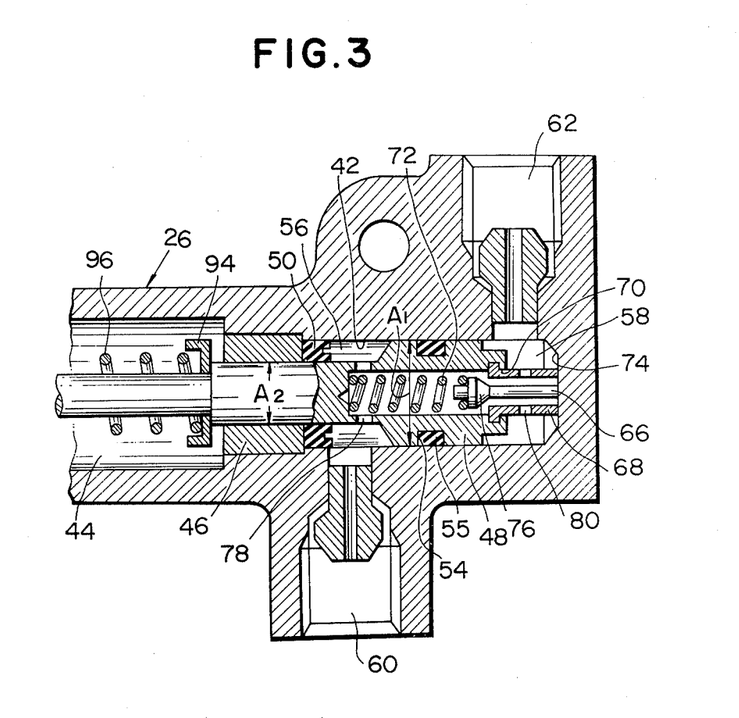
FIG. 3 is a further enlarged partial sectional view of the control valve means of FIG. 2 showing the position in which a valve is opened.
Figure 4:
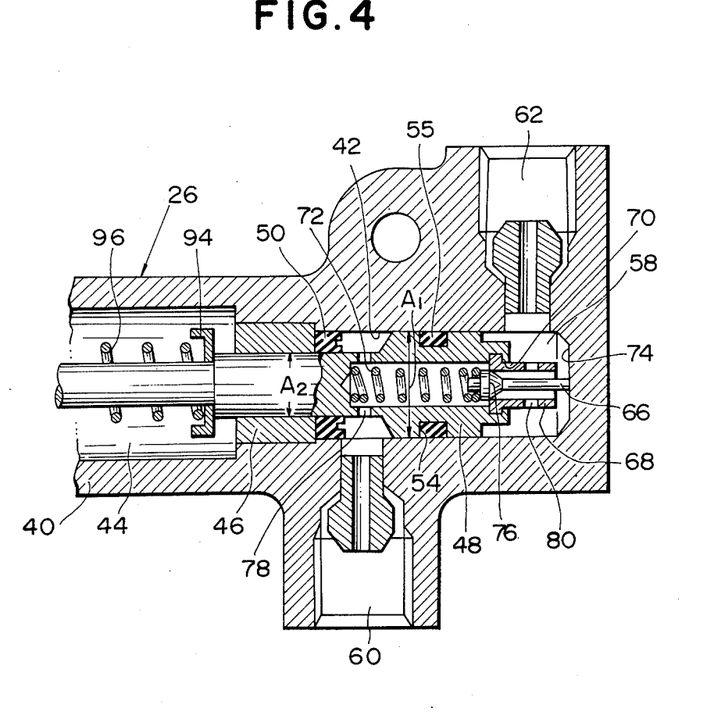
FIG. 4 is a sectional view similar to FIG. 3, but showing the position in which the valve is closed.
Figure 5:
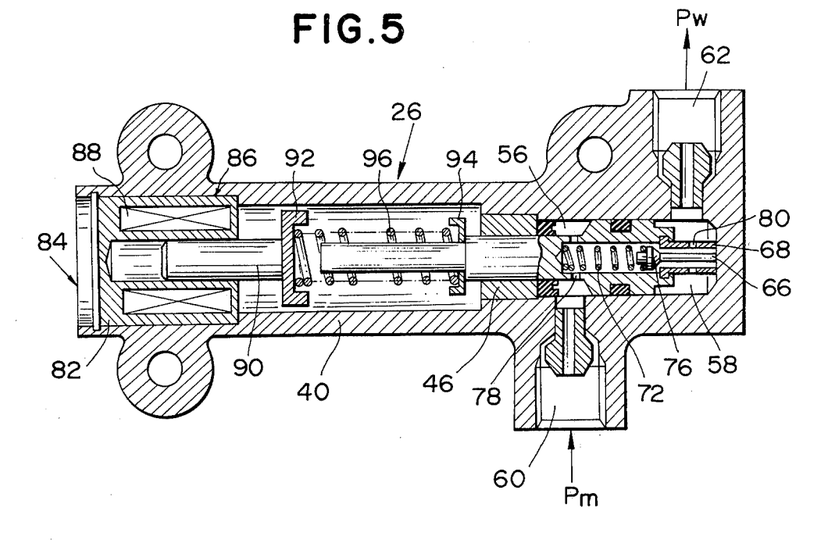
FIG. 5 is a sectional view similar to FIG. 2, showing a position where the solenoid is actuated.

When the foot pedal 12 is moved from the released position to the applied position, braking pressure is applied to the master cylinder 10 via the hydraulic boost mechanism. The master cylinder 10 supplies hydraulic pressure fluid via hydraulic circuits 185, 189, 245 and 249 to the control valve means 26. Fluid flows into the chamber 56 of the valve means 26 through the inlet port 60. At this time, the thrust plunger 52 is in a neutral position and the end of the stem of valve member 66 abuts the bottom of the bore to release the valve member 66 from the valve seat 68 as shown in FIGS. 2 and 3. Accordingly, the chamber 56 communicates chamber 58 through the orifice 78, the bore 64 and the orifice 80, and thus fluid can be supplied to the wheel cylinder corresponding thereto. At this time, the hydraulic fluid pressure Pw applied to the wheel cylinder through the outlet port 62 of the control valve means 26 is substantially the same as the fluid pressure Pm generated by and supplied from the master cylinder 10. By increasing the value of fluid pressure built up in the master cylinder and continuously applying it to the wheel cylinders, the pressure Pw is proportionally increased within a range a-b as shown in FIG. 3. The critical point b of proportionally increasing pressure Pw is determined by the balance of pressure Pm applied from the master cylinder 10 and the force F of the spring 96. When the pressure Pw applied to the wheel cylinder is in the range a-b, the value of pressure applied to the piston 48 is smaller than the spring force. Therefore, the hydraulic pressure applied to the piston cannot overcome the force of the spring. At this time, the relationship between the hydraulic pressure Pw and force of spring 96 will be:

$$Pm.A_2 = F$$

where $A_2$ is the sectional area of the internal opening of the retainer. By further continuously applying pressure from the master cylinder 10, the pressure Pm is continuously increased to reach the critical point Ps. Due to the increase of the pressure Pm, the fluid pressure acting at the end of the piston 48 opposing the chamber 58 is increased and thus becomes the same or than the force F of the spring 96 to move the piston 48 to the left in FIG. 2. When the pressure Pm exceeds the force of the spring 96 the piston is moved to the left and thereby the valve seat 68 is moved to left according to the movement of the piston 48. In this time, the valve member 66 in urged toward right in FIGS. 2 and 3 by the spring 72. Thus, the valve member 66 is seated on the valve seat 68 to close the valve, as shown in FIG. 4. Therefore, the critical point of fluid pressure Ps is spring a force subject to unit area of the piston 48 and is governed by the following relationship:

$$Ps = F/A_2 \qquad \text{(Formula I)}$$

In this position, still further applying the master cylinder 10 and supplying pressure fluid to the control valve 26 causes an increase of fluid pressure within the chamber 56. The pressure increase in the chamber 56 is applied to the projecting annular portion 52 to push the same to the right in FIG. 2. Thereby, the end of the stem of the valve member 56 abuts the bottom 74 of the bore and by further movement the piston 48 and valve seat 68 to the right, the valve member 66 is released from the valve seat 68 to open the valve. Thereby, the fluid pressure can flow into the chamber 58 through the valve and the orifices 80 and thus flow to the wheel cylinder to increase the braking fluid pressure. When the fluid pressure in both of the chambers 56 and 58 becomes even, the piston 48 is pushed back to the left by the hydraulic pressure Pw acting on the end of the piston 48. By repeating the foregoing function by thrusting the piston 48, the fluid pressure Pw in the wheel cylinder is gradually increased. At this time, the piston will be subject to a hydraulic pressure $Pw.A_1$ in both the chambers 56 and 58. The hydraulic pressure $Pw.A_1$ applied to the piston 48 is balanced. Then, the piston is subject to a hydraulic pressure which can be calculated by the following formula:

$$Pw.A_1 = Pm(A_1 - A_2) + F \qquad \text{(Formula II)}$$

where $Pm \geq Ps$ $A_1$ is the cross-sectional area of the piston at the projecting portion 52.

By the above formula II, the fluid pressure Pw applied to a wheel cylinder is as follows:

$$Pw = \frac{A_1 - A_2}{A_1} \cdot Pm + \frac{F}{A_1} \qquad \text{(Formula III)}$$

$$= mPm + \frac{F}{A_1}$$

$$\text{wherein } m = \frac{A_1 - A_2}{A_1}$$

The piston moves between a first position in which the valve seat is released from the bottom of the bore and thereby closes the valve and a second position in which the valve seat abuts the bottom of the bore to open the valve. Actually the range of movement of the piston between the first position and the second position is quite short, and the piston vibrates therebetween. Therefore, brake fluid is intermittently supplied to the wheel cylinder through the valve and the outlet port.

Figure 6:
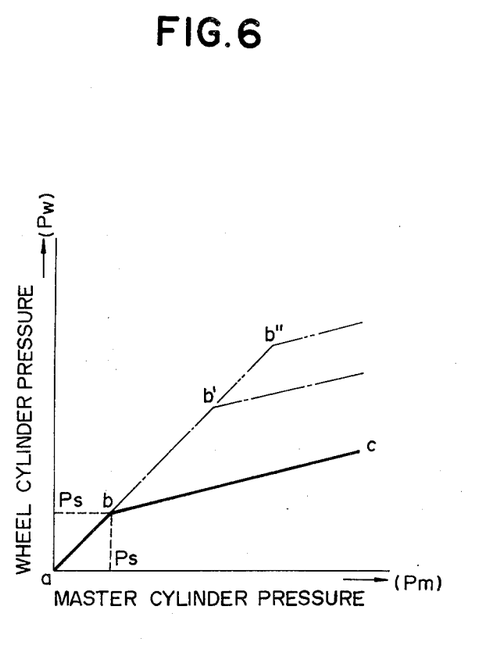
FIG. 6 is a graph showing the process of building up the hydraulic fluid pressure in a wheel cylinder.
Figure 7:
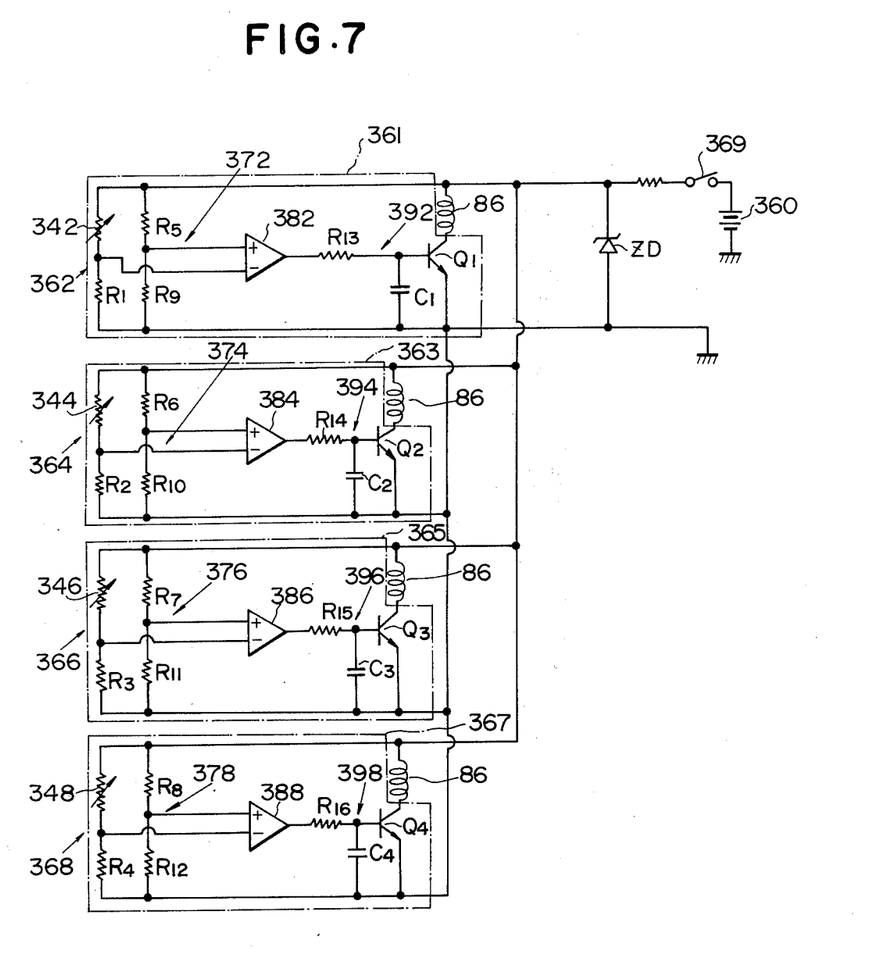
FIG. 7 is a circuit diagram of a control circuit employed in the braking system of FIG. 1.

Although FIG. 6 shows a straight line in a range exceeding the vertical point b for simplification of illustration, the fluid pressure in the wheel cylinder is increased at one cycle of piston operation at a ratio:

$$m = (Pm - Pw)(A_1 - A_2)$$

As is clear from the foregoing formulas and will be apparent from FIG. 6, when fluid pressure Pm from the master cylinder is increased to the critical point Ps and is further increased, pressure fluid is supplied to each wheel cylinder through the control valve means 26 in the abovementioned manner. At this time, fluid pressure Pw within the wheel cylinder is built up at a ratio m which, it is apparent from formula III, is smaller than 1, as shown by b-c in FIG. 3.

Since the critical point Ps is determined by the force F of the helical spring 96, the critical point Ps of the fluid pressure will be adjusted by adjustment of the spring force. As stated above, the force of spring 96 can be adjusted by the voltage applied to the solenoid 86 by which the plunger 90 is moved to and fro with respect to the helical spring 96. Thereby, if the voltage applied to the solenoid 86 is increased, the plunger 90 is moved to the right in FIG. 2, so as to increase the spring force F urging the piston 48 to the right. This causes the critical point Ps to rise, to points b', b'' in FIG. 3, for example. Thereby, fluid pressure Pw within the wheel cylinder will be built up more rapidly relative to the position where the spring 96 matches the force thereof.

Each solenoid 86 of the control valve 90 is supplied a voltage depending on the load applied to the corresponding vehicle wheel. The relative loads applied to the front and rear wheels are measured by the measuring means 30, as shown in FIG. 1. When the vehicle is decelerated, a load will be applied to the front and rear wheels in a ratio depending on the inertia of the vehicle. Thereby, when the vehicle is decelerated, the ball 32 is moved by inertia in a direction which is determined by the relative loads. By the movement of the ball 32, one or two load resistors is pushed by the ball 32 to increase its resistance value. As shown in FIG. 1, each load cell 342, 344, 346 and 348 is connected to the solenoid 86 of the corresponding control valve means 26 through the control circuit 36.

For purpose of illustration only, and not by way of limitation, there is illustrated a circuit diagram a preferred embodiment of the control circuit according to the present invention, in FIG. 4. The load cells 342, 344, 346 and 348 are connected in series resistors $R_1$ to $R_4$ provided in the control circuit to form first potential dividers 362, 364, 366 and 368. Parallel to each of the first potential dividers 362, 364, 366 and 368 with respect to a power source 360, are provided second potential dividers 372, 374, 376 aand 378 comprising resistors $R_5$ to $R_8$ and $R_9$ to $R_{12}$. The first potential dividers 342, 344, 346 and 348 are connected to the negative side input terminals of differential amplifiers 382, 384, 386 and 388, and the second potential dividers 362, 364, 366 and 368 are connected to the positive side input terminals of the differential amplifiers 382, 384, 386 and 388. The output terminal of each differential amplifier 382, 384, 386 and 388 is connected to the base electrode of a transistor $Q_1$, $Q_2$, $Q_3$ and $Q_4$ (of the NPN type in the illustrated case) through a resistor $R_{13}$, $R_{14}$, $R_{15}$ and $R_{16}$. The resistors $R_{13}$ to $R_{16}$ form smoothing circuits 392, 394, 396 and 398 together with condensors $C_1$ to $C_4$ to smooth the electric voltage supplied to the base electrode of the transistors $Q_1$ to $Q_4$. The first and second potential dividers 362 and 372, the differential amplifier 382, the transistor $Q_1$ and smoothing circuit 392 consist a first control circuit 361 for controlling one of the control valve means 26 corresponding to, for example, the wheel cylinder 182. The remaining first and second dividers, differential amplifiers, transistors and smoothing circuits are also combined to form second to fourth control circuits 363, 365 and 367 in the same manner. The first to fourth control circuits 361, 363, 365 and 367 form an OR-circuit for supplying an electric load to one or two of the solenoid coils 86.

In the preferred embodiment, the control circuit 36 is connected to a battery 360 through an ignition switch 369, and is provided with a Zener diode ZD which is disposed between the control circuit and the battery 360 for stabilizing the electric voltage supplied to the control circuit.

Each solenoid coil 86 is connected to the collector electrode of one of the transistors $Q_1$ to $Q_4$. Each solenoid coil 86 is also connected to the battery 360 through the ignition switch 361 so as to be constantly supplied with a positive voltage when the switch 361 is closed. The emitter electrode of each transistor $Q_1$ to $Q_4$ is grounded.

When the ball 32 is in a neutral position and thereby each load cell 342, 344, 346 and 348 has minimum resistance, a maximum voltage is supplied to the negative side input terminal of the differential amplifiers 382, 384, 386 and 388. At this time, a reference voltage is supplied to the positive side input terminal of the differential amplifiers 382, 384, 386 and 388 through the second potential dividers 372, 374, 376 and 378. Thereby, each differential amplifier 382, 384, 386 and 388 outputs a minimum voltage to be supplied to the base electrodes of the transistors $Q_1$ to $Q_4$ so as not to turn off the transistors $Q_1$ to $Q_4$. Thereby a minimum electrical current flows to the collector electrode through each solenoid 86.

When the vehicle moves through a curve and thus the surface supporting the ball 32 is tilted, or the vehicle is decelerated to subject the ball to inertia, the ball member 32 is moved to push one or two of the load cells to increase the resistance values thereof. We shall now describe by way of example the case when the ball 32 moves toward the load cell 342 corresponding to the wheel cylinder 182, for the purpose of simplification. It will be appreciated that such a condition will arise when the surface supporting the ball 32 is tilted toward the load cell 342 or when the vehicle is rapidly decelerated. The load cell 342 is pushed by the ball member to increase the resistance value thereof. Thereby, an electric voltage inputted to the negative side input terminal of the differential amplifier 382 through the first potential divider 362 is decreased, and the voltage difference between the negative side input and the reference voltage supplied to the positive side input will increase. This causes the differential amplifier to output a larger voltage compared with the normal position to be supplied to the base electrode of the transistor $Q_1$. Thus, the transistor $Q_1$ is cut off to allow an increased electric current to flow to the collector electrode thereof through the solenoid coil 86 of the control valve 26 corresponding to the wheel cylinder 182. At this time, the electric current flowing through the solenoid coil 86 corresponds and is proportional to the resistance value of the load cell 342.

By increasing the electric current flowing through the solenoid coil, the plunger 90 is moved toward the seat 94 to increase the force of the spring 96 above the critical point Ps. Thereby, a larger fluid pressure is applied to the wheel cylinder 182 to apply the brake to the wheel simultaneous to the other wheels which are subject to a comparatively light load.

Thereby, the invention can fulfill all the object and advantages sought in the invention.

Although the present invention has been shown and described in terms of the preferred embodiment, it should not be considered as limited to this, however, or mere and simple generalizations, or other detailed modifications. Further variations to any particular embodiment could be made without departing from the scope of the present invention, which it is therefore desired should be delimited and defined not by any of the perhaps purely fortuitous details of the shown embodiments, or of the drawings, but solely by the accompanying claims.

What is claimed is:

1. In a hydraulic vehicle brake system having a master cylinder connected with an operating means, wheel cylinders corresponding to each of individual vehicle wheels and a hydraulic circuit connecting said master cylinder to each wheel cylinder, a control device comprising:

a means for measuring the relative ratio of a load applied to each individual wheel in relation to that of the remaining wheels;

a control circuit cooperatively associated with said load measuring means and generating control signals which are respectively representative of relative loads on respective corresponding wheels; and a plurality of control valves respectively interposed between said master cylinder and said wheel cylinders in said hydraulic circuit, in which each of said control valves corresponds to one of said individual wheel cylinders and in which each control valve includes means for controlling the hydraulic pressure built up in the wheel cylinder independently and corresponding to a signal value represented by the control signal fed to each individual control valve.

2. A control device, as recited in claim 1, wherein each of said control valves comprises a valve member with a valve seat, a spring means adjustably urging said valve member onto said valve seat and a means for adjusting the force of said spring means electrically connected to said control circuit.

3. A control device, as recited in claim 2, wherein said load measuring means comprises a ball movably mounted on a substantially horizontal surface and a plurality of measuring elements mounted on said surface to surround said ball and producing an electrical signal corresponding to the load applied thereto, in which each of said measuring elements is associated with the wheel in whose direction the ball moves to vary the electrical signal produced by said measuring element.

4. A control device, as recited in claim 3, wherein said measuring element is a load cell facing said ball member and having a resistance which is changed by the pressure of said ball.

5. A control means, as recited in any one of claims 1 to 4 inclusive, wherein said control circuit includes switching elements for controlling said spring force adjusting means, each of which corresponds and is connected to a control valve means, the value of the current flowing therethrough is proportional to the load applied to the corresponding vehicle wheel.

6. A control means, as recited in any one of claims 1 to 4 inclusive, wherein said control circuit comprises a plurality of differential amplifiers, a plurality of first resistors connected in series to said load cell so as to form first potential dividers each of which is connected to a corresponding one of the differential amplifiers; a plurality each of second and third resistors forming second potential dividers each of which is connected to a corresponding one of the differential amplifiers parallel to said first potential dividers; a plurality of transistors each connected to the output terminal of one of said differential amplifiers each of which is cut off on the neutral position of the ball member or when load subject thereto is reduced relative to neutral position.

7. A control means, as recited in claim 6, in which each of said transistors is an NPN-transistor.

8. A control means, as recited in claim 2, wherein said control valve means comprises a housing having an inlet port communicating with said master cylinder via hydraulic circuit and an outlet port communicating with said wheel cylinder and provided with a longitudinal bore one end of which is exposed to the exterior of the housing and is closed by end fitting including said spring force adjusting means, a thrust piston formed with an internal longitudinal bore with said valve member and valve seat, in which the piston is provided with a first annular fluid passage communicating with said inlet port and a plurality of orifices connecting said passage to said internal bore, which said valve seat is fixed on an open end of the bore and is formed with a plurality of orifices connecting the internal bore to a second passage defined between said bore of housing and one end of the piston and communicating with the outlet port, and a spring member one end of which is seated at the other end of the piston and the other end of which is connected to said spring force adjusting means.

9. A control means, as recited in any one of claims 1 to 4 and 8, wherein said spring force adjusting means comprises a solenoid electrically associated with said control circuit so that it may be actuated when said load measuring means detects a larger load applied to a vehicle wheel corresponding thereto than to the other wheels, and a plunger member movably disposed within the solenoid coil to adjust spring force by to and fro movement thereof.

10. A control means, as recited in claim 9, wherein said thrust piston moves rapidly between a first position where the valve member is released from the valve seat and thus opens the valve to a second position where the valve member is seated at the valve seat and thus closes the valve, and from the second position to the first position, when hydraulic fluid pressure built up in the master cylinder and subject to the thrust piston is larger than the spring force.

11. A control means, as recited in claim 8, wherein said valve member is a poppet valve having a stem portion slightly longer than the valve seat.

12. In a hydraulic vehicle brake system having a master cylinder connected with an operating means, wheel cylinders each one of which is independent from the others, the wheel cylinders each operating a brake mechanism provided on each individual vehicle wheel, and a hydraulic circuit connecting said master cylinder to each wheel cylinder,
a control device comprising, in combination:
a load measuring means for measuring the relative ratio of a load applied to each individual wheel in relation to that of the remaining wheels;
a control circuit cooperatively associated with said load measuring means and generating control signals which respectively correspond to relative loads on respective individual wheels; and
a plurality of control valves respectively interpositioned between said master cylinder and said wheel cylinders in said hydraulic circuit, each of said control valves corresponding to one of said individual wheel cylinders, each of said control valves including means for controlling the hydraulic pressure built up in the corresponding wheel cylinder independently and corresponding to the value of the control signal fed thereto, and which control valve includes a valve member with a valve seat, a spring adjustably urging said valve member onto said valve seat and a means for adjusting the force of said spring, which adjusting means is electrically connected to said control circuit.

13. In a hydraulic vehicle brake system having a master cylinder connected with an operating means, wheel cylinders corresponding to each of individual wheels of a vehicle and a hydraulic circuit connecting said master cylinder to each wheel cylinder;
a control device comprising in combination:
a load measuring means for measuring the relative ratio of a load applied to each of the individual wheels in relation to that of the remaining wheels, which load measuring means includes a movable member movably mounted on a substantially horizontal plane and a plurality of stationary members mounted on said plane so that they surround said movable member and are respectively located with respect to said movable member in directions corresponding, respectively, to the individual wheels, each of said stationary members being responsive to a pressure applied thereto by said movable member and generating a signal representative of the relative load of each individual wheel;
a control circuit cooperatively associated with said load measuring means and generating control signals which are representative of relative loads on respective vehicle wheels; and a plurality of control valves respectively interpositioned between said master cylinder and said wheel cylinders in said hydraulic circuit and operatively coupled with said control circuit, in which each of said control valves corresponds to one of said individual wheel cylinders and in which each such control valve includes means for controlling the hydraulic pressure built up in the corresponding wheel cylinder independently and corresponding to the signal value of said control signal fed thereto.

14. In a hydraulic vehicle brake system having a master cylinder connected with an operating means, wheel cylinders respectively and independently operating a brake mechanism provided on each of individual vehicle wheels and a hydraulic circuit connecting the master cylinder to each of individual wheel cylinders, a control device comprising in combination:

a load measuring means for measuring the relative ratio of a load applied to each of individual vehicle wheels in relation to that of the others, which load measuring means includes a movable member movably mounted on a substantially horizontal plane and a plurality of stationary members mounted on said horizontal plane so that they surround said movable member and are located with respect to said movable member in directions corresponding to respective ones of the vehicle wheels, each of said stationary members being responsive to a pressure applied thereto by said movable member and generating a signal representative of the relative load of each individual wheel;

a control circuit cooperatively associated with said load measuring means and generating control signals which correspond to relative loads on respective individual vehicle wheels; and a plurality of control valves respectively interpostioned between said master cylinder and said wheel cylinders in said hydraulic circuit, each of said control valves corresponding to one of said individual wheel cylinders, and wherein each of said control valves includes means for controlling the hydraulic pressure built up in the wheel cylinder independently and corresponding to the signal value of the control signal fed thereto, and which control valve includes a valve member with a valve seat, a spring, and means for adjusting the force of said spring, said adjusting means being electrically connected to said control circuit.

15. A control device as recited in claim 13 or 14, wherein said stationary member is a load cell facing said movable member and having a resistance which is changed by the pressure of said movable member.

16. A control device as recited in claim 12, 13 or 14, wherein said control circuit includes switching elements for controlling said spring force adjusting means, wherein each of said switching elements corresponds to and is connected to a control valve means, and wherein the value of the current flowing through each of said switching elements is proportional to the load applied to the corresponding vehicle wheel.

17. A control device as recited in claim 13 or 14, wherein said movable member has a neutral position corresponding to a condition in which the vehicle is not undergoing deceleration and wherein said control circuit comprises:

a plurality of differential amplifiers and a plurality of first resistors connected in series to said stationary members so as to form first potential dividers, each of which is connected to a corresponding one of the differential amplifiers;

a plurality each of second and third resistors forming second potential dividers, each of which is connected to a corresponding one of the differential amplifiers in parallel with said first potential dividers;

a plurality of transistors, each connected to the output terminal of one of said differential amplifiers, each of which is cut off at the neutral position of the movable member or when the load subject thereto is reduced relative to neutral position.

18. A control device as recited in claim 17, in which each of said transistors is an NPN-transistor.

19. A control device as recited in claim 12 or 14, wherein said control valve comprises a housing having an inlet port communicating with said master cylinder via the hydraulic circuit, said control valve including an outlet port communicating with the corresponding wheel cylinder and provided with a longitudinal bore, one end of which is exposed to the exterior of the housing, said bore being closed by an end fitting which includes said spring force adjusting means; a thrust piston formed with an internal longitudinal bore with said valve member and valve seat, in which the piston is provided with a first annular fluid passage communicating with said inlet port and a plurality of orifices connecting said passage to said internal bore, said valve seat being fixed on an open end of the bore and being formed with a plurality of orifices connecting the internal bore to a second passage defined between said bore of said housing and one end of the piston and communicating with the outlet port; and a spring member, one end of which is seated at the other end of the piston and the other end of which is connected to said spring force adjusting means.

20. A control device as recited in claim 13, wherein each of said control valves comprises a valve member with a valve seat, a spring means adjustably urging said valve member onto said valve seat and a means for adjusting the force of said spring means electrically connected to said control circuit.

21. A control device as recited in claim 20, wherein said control valve comprises a housing having an inlet port communicating with said master cylinder via the hydraulic circuit, said control valve including an outlet port communicating with the corresponding wheel cylinder and provided with a longitudinal bore, one end of which is exposed to the exterior of the housing, said bore being closed by an end fitting including said spring force adjusting means, a thrust piston formed with an internal longitudinal bore with said valve member and valve seat, in which the piston is provided with a first annular fluid passage communicating with said inlet port and a plurality of orifices connecting said passage to said internal bore, said valve seat being fixed on an open end of the bore and being formed with a plurality of orifices connecting the internal bore to a second passage defined between said bore of said housing and one end of the piston and communicating with the outlet port; and a spring member, one end of which is seated at the other end of the piston and the other end of which is connected to said spring force adjusting means.

22. A control means as recited in claim 12, 14 or 20, wherein said spring force adjusting means comprises a solenoid which includes a coil, said solenoid being electrically associated with said control circuit so that it may be actuated when said load measuring means detects a larger load applied to a vehicle wheel corresponding thereto than to the other wheels, and a plunger member movably disposed within the solenoid coil to adjusting spring force by to and fro movement thereof.

23. A control means as recited in claim 19, wherein said spring force adjusting means comprises a solenoid which includes a coil, said solenoid being electrically associated with said control circuit so that it may be actuated when said load measuring means detects a larger load applied to a vehicle wheel corresponding thereto than to the other wheels, and a plunger member movably disposed within the solenoid coil to adjust spring force by to and fro movement thereof.

24. A control means as recited in claim 23, wherein said thrust piston moves rapidly between a first position where the valve member is released from the valve seat and thus opens the valve to a second position where the valve member is seated at the valve seat and thus closes the valve, and from the second position to the first position, when hydraulic fluid pressure built up in the master cylinder and subject to the thrust piston is larger than the spring force.

25. A control means as recited in claim 21, wherein said valve member is a poppet valve having a stem portion slightly longer than the valve seat.

* * * * *